United States Patent
Herzog et al.

(10) Patent No.: US 11,098,145 B2
(45) Date of Patent: *Aug. 24, 2021

(54) METHOD FOR THE SYNTHESIS OF A COPOLYMER, COPOLYMER, RUBBER MIXTURE, AND USE THEREOF

(71) Applicant: Continental Reifen Deutschland GmbH, Hannover (DE)

(72) Inventors: Katharina Herzog, Harsum (DE); Lena Mueller, Lauenhagen (DE); Carla Recker, Hannover (DE); Noa Pruss, Frankfurt (DE); Cathrin Sonja Conrad, Eschborn (DE); Phillipp Vana, Bad Gandersheim (DE)

(73) Assignee: Continental Reifen Deutschland GmbH, Hannover (DE)

( * ) Notice: Subject to any disclaimer, the term of this patent is extended or adjusted under 35 U.S.C. 154(b) by 31 days.

This patent is subject to a terminal disclaimer.

(21) Appl. No.: 15/810,699

(22) Filed: Nov. 13, 2017

(65) Prior Publication Data
US 2018/0066094 A1    Mar. 8, 2018

Related U.S. Application Data

(63) Continuation of application No. PCT/EP2016/060381, filed on May 10, 2016.

(30) Foreign Application Priority Data

May 12, 2015   (DE) .......................... 102015208814.6

(51) Int. Cl.
*C08F 236/06*    (2006.01)
*C08F 212/14*    (2006.01)
(Continued)

(52) U.S. Cl.
CPC .......... *C08F 236/06* (2013.01); *B29B 7/7495* (2013.01); *B29D 30/06* (2013.01);
(Continued)

(58) Field of Classification Search
CPC ...... C08F 236/06; C08F 112/14; C08F 12/30; C08F 212/14; B29D 30/06; B29D 30/0601; B60C 1/00; B29K 2081/00
See application file for complete search history.

(56) References Cited

U.S. PATENT DOCUMENTS 2,947,731 A * 8/1960  Nummy ................ C07C 327/00
                                                          525/55
3,162,665 A    12/1964  Szabo et al.
(Continued)

FOREIGN PATENT DOCUMENTS

EP    0034020 A1    8/1981
GB    1355106 A     6/1974
(Continued)

OTHER PUBLICATIONS

Wulff, Funter and Ilona Schulze, "Enyzme-Analogue Built Polymers. IX. Polymers with Mercapto Groups of Definite Cooperativity", 1978, Israel Journal of Chemistry, vol. 17 Issue 4, p. 291-297 (Year: 1978).*

(Continued)

*Primary Examiner* — Ling Siu Choi
*Assistant Examiner* — David L Miller
(74) *Attorney, Agent, or Firm* — David L. Cate; Gregory Adams

(57) ABSTRACT

Disclosed are processes for preparing a copolymer, a copolymer prepared by the process, a sulfur-crosslinkable rubber mixture, and the use of the sulfur-crosslinkable rubber mixture for production of motor vehicle tires. In one embodiment, the monomer has the formula: A-S-P, wherein (Continued)

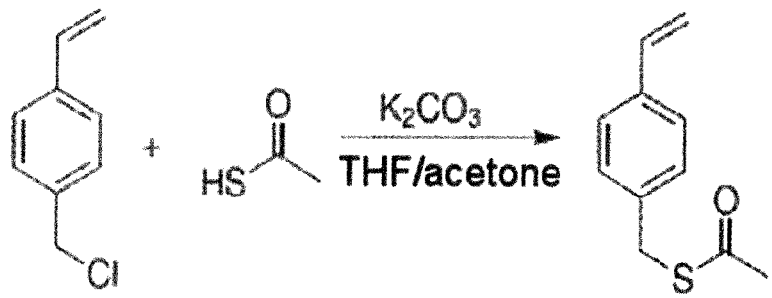

schematic diagram of the synthesis of 4-vinylbenzyl thioacetate

A is a chemical group containing at least one aliphatic double bond, S is a sulfur atom, and P is a protecting group.

2 Claims, 1 Drawing Sheet

(51) Int. Cl.
| | |
|---|---|
| *B60C 1/00* | (2006.01) |
| *B29B 7/74* | (2006.01) |
| *B29D 30/06* | (2006.01) |
| *C08K 3/06* | (2006.01) |
| *C08F 112/14* | (2006.01) |
| *C08F 12/30* | (2006.01) |
| *B29K 81/00* | (2006.01) |

(52) U.S. Cl.
 CPC .............. *B60C 1/00* (2013.01); *C08F 212/14* (2013.01); *B29K 2081/00* (2013.01); *C08F 12/30* (2013.01); *C08F 112/14* (2013.01); *C08K 3/06* (2013.01)

(56) References Cited

U.S. PATENT DOCUMENTS

| | | | | |
|---|---|---|---|---|
| 3,686,323 | A | | 8/1972 | Brodnitz et al. |
| 4,483,960 | A | | 11/1984 | Agarwal et al. |
| 4,929,694 | A | * | 5/1990 | Aslam ................... C08F 212/14 526/262 |
| 7,968,633 | B2 | | 6/2011 | York et al. |
| 7,968,634 | B2 | | 6/2011 | York et al. |
| 7,968,635 | B2 | | 6/2011 | York et al. |
| 7,968,636 | B2 | | 6/2011 | York et al. |
| 8,182,626 | B2 | | 5/2012 | Recker et al. |
| 8,252,863 | B2 | | 8/2012 | Hasse et al. |
| 8,394,887 | B2 | * | 3/2013 | Yamauchi ............. C08F 220/22 524/544 |
| 2003/0013830 | A1 | | 1/2003 | Blevins et al. |
| 2010/0108239 | A1 | | 5/2010 | Recker et al. |
| 2013/0131240 | A1 | | 5/2013 | Uekita et al. |
| 2018/0065928 | A1 | | 3/2018 | Herzog et al. |

FOREIGN PATENT DOCUMENTS

| | | | |
|---|---|---|---|
| JP | 08143627 A | * | 6/1996 |
| JP | 2006199827 A | | 8/2006 |
| WO | 9909036 A1 | | 2/1999 |

OTHER PUBLICATIONS

Conrad, Cathrin Sonja "Polybutadien und Butadien enthaltende Copolymere mit gezielt eingenbauten vulkanisierbaren Gruppen durch Raft-Polymerisation", 2013, English Language Translation of Chapters 2, 7, 8 and 10 (Year: 2013).*

Conrad, Cathrin Sonja "Polybutadien un Butadien enthaltede Copolymere mit geziet eingenbauten Vulkanisierbaren Gruppen durch Raft-Polymerisation", 2013, English Machine translation of document (Year: 2013).*

English translation of International Search Report dated Jul. 19, 2016 of international application PCT/EP20161060381 on which this application is based.

Gonzalez-Fernandez, D. et al, "Copolymers with acetyl-protected thiol pendant groups as highly efficient stabilizing agents for gold surfaces", RSC Advances: An International Journal to Further the Chemical Sciences, Bd. 5, Nr. 18, Jan. 1, 2015, pp. 13722 to 13726, XP055287489.

English translation of International Search Report dated Jun. 30, 2016 of co-pending international application PCT/EP2016/060383. Kozikowski, A. et al, "Chemistry of the Main Group Metals: A Stereoselective Synthesis of Allyl Vinyl Thioethers for the Thio-Claisen Reaction", Journal of Organometallic Chemistry, vol. 164, No. 2, Jan. 1, 1979, pp. C33 to C37, XP055167859.

Cathrin Sonja Conrad / Polybutadien und Butadien enthaltende Copolymere mit gezielt eingebauten vulkanisierbaren Gruppen durch RAFT-Polymerisation, Göttingen 2013.

* cited by examiner

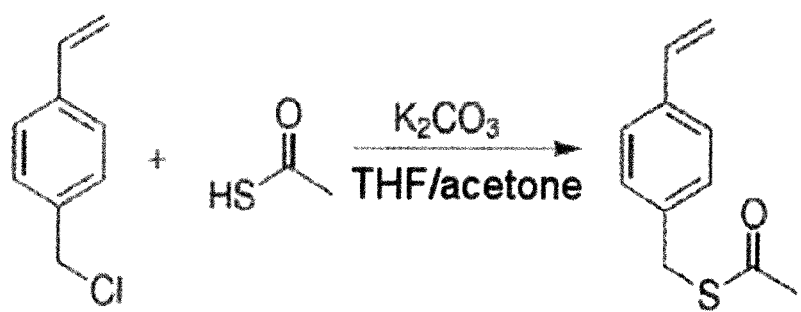
schematic diagram of the synthesis of 4-vinylbenzyl thioacetate

METHOD FOR THE SYNTHESIS OF A COPOLYMER, COPOLYMER, RUBBER MIXTURE, AND USE THEREOF

CROSS REFERENCE TO RELATED APPLICATIONS

This application is a continuation application of international patent application PCT/EP2016/060381, filed May 10, 2016 designating the United States and claiming priority from German application 10 2015 208 814.6, filed May 12, 2015, and the entire content of both applications is incorporated herein by reference.

FIELD OF THE INVENTION

Disclosed are processes for preparing a copolymer, a copolymer prepared by the process, a sulfur-crosslinkable rubber mixture, and the use of the sulfur-crosslinkable rubber mixture for production of motor vehicle tires, cords, belts and hoses.

BACKGROUND OF THE INVENTION

Copolymers, for example styrene-butadiene rubber, are used in sulfur-crosslinkable rubber mixtures in order to influence properties such as the abrasion characteristics and/or the tear properties and/or the rolling resistance characteristics. However, the structure of node formation in sulfur vulcanization is very substantially a matter of chance. As a result, the properties cannot be specifically influenced and improved as desired.

SUMMARY OF THE INVENTION

Provided are processes for preparing a copolymer, such that the copolymers prepared in a vulcanized rubber mixture achieve an improvement in abrasion characteristics and/or tear properties and/or rolling resistance characteristics.

This object is achieved by a process for preparing a copolymer by free-radical copolymerization of a monomer of formula I) with at least one diene $$A\text{-}S\text{-}P \qquad \qquad I)$$

where A is a chemical group containing at least one aliphatic double bond, and
where S is a sulfur atom, and
where P is a protecting group selected from the group consisting of
$S(=O)_2$—$R^1$ with $R^1$=alkyl, benzyl or phenyl and/or
S—C(=S)—N—$R^2R^3$ with $R^2$ and $R^3$=alkyl, benzyl or phenyl and/or
C(=O)—$R^4$ with $R^4$=alkyl and/or
N—$R^5R^6$ with $R^5$=hydrogen atom (H), alkyl, benzyl or phenyl and
$R^6$=alkyl, benzyl or phenyl and/or
$SiR^7R^8R^9$ with $R^7$, $R^8$ and $R^9$=alkyl or benzyl and/or
$S(=O)_2$—OM with M=Na, K or H.

In the disclosed processes, at least one monomer having a) at least one double bond that can take part in a polymerization, and b) a protected mercapto group which is deprotected at a later stage in the vulcanization of the copolymers thus prepared, such that the sulfur atom of this mercapto group can take part in the vulcanization, is thus used. In this way, the node structure of the sulfur vulcanizates prepared with the copolymer can be better adjusted as compared with the prior art, which has a positive effect on the abrasion characteristics and/or the tear properties and/or the rolling resistance characteristics of the rubber mixture.

In the disclosed processes for preparing a copolymer, it is possible to employ all the standard free-radical methods, especially in solution, in emulsion and under RAFT conditions with RAFT-typical agents.

The $R^1$ to $R^9$ radicals in the protecting group P that are mentioned in formula I) can, as detailed above, be alkyl groups, such as alkyl groups having 1 to 10 carbon atoms. In addition, O=oxygen atom, N=nitrogen atom, Na=sodium, which is in the form of Nat, and K=potassium, which is in the form of K.

The A group is a chemical group containing at least one aliphatic double bond, such as at least one terminal double bond, that is, vinylic double bond. In this context, all chemical groups having at least the feature of the aliphatic, e.g., terminal, vinylic C=C double bond are conceivable in principle. A double bond of this kind is suitable for taking part in a polymerization, which means that the compound of formula I) is a suitable monomer for a later copolymer.

In the context of the present disclosure, the term "double bond" is understood to mean a carbon-carbon double bond, that is, C=C, unless explicitly referred to otherwise.

In one embodiment, A is a 4-vinylbenzyl group.

In one embodiment, the protecting group P can be selected from the group consisting of:
$S(=O)_2$—$R^1$ with $R^1$=alkyl, benzyl or phenyl and/or
S—C(=S)—N—$R^2R^3$ with $R^2$ and $R^3$=alkyl, benzyl or phenyl and/or
C(=O)—$R^4$ with $R^4$=alkyl and/or
N—$R^5R^6$ with $R^5$=hydrogen atom (H), alkyl, benzyl or phenyl and
$R^6$=alkyl, benzyl or phenyl.

BRIEF DESCRIPTION OF THE DRAWING

The drawing (FIG. 1) shows a schematic diagram of the synthesis of 4-vinylbenzyl thioacetate

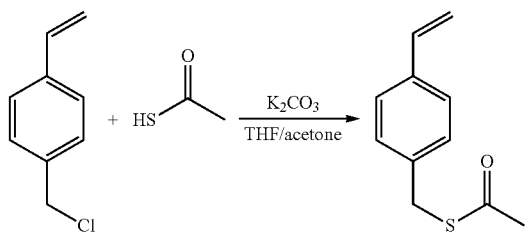

DESCRIPTION OF THE PREFERRED EMBODIMENTS OF THE INVENTION

In one embodiment, the monomer is 4-vinylbenzyl thioacetate, where A is a 4-vinylbenzyl group and P is a C(=O)—$CH_3$ group.

This compound thus has the formula II)

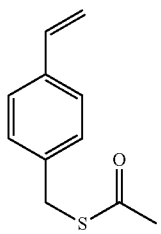

II)

The monomer of formula II), that is, 4-vinylbenzyl thioacetate (abbreviated to ViBET), can be prepared by the following disclosed process: ViBET is synthesized in polar aprotic solvents, such as THF and/or acetone, from 4-vinylbenzyl chloride and thioacetic acid with the aid of a base, such as potassium carbonate, as shown in FIG. 1. The term "THF" as used herein stands for tetrahydrofuran.

The synthesis is also suitable for the pilot plant scale, since the reactant is converted quantitatively and no further purification is required. The synthesis disclosed in U.S. Pat. No. 2,947,731 is effected in short-chain aliphatic alcohols such as methanol with a thio acid salt (prepared in situ from thioacetic acid and an alkali metal hydroxide), that reacts with 4-vinylbenzyl chloride to give the desired product, but this has to be purified by distillation.

Polar aprotic solvents have a high dielectric constant or dielectric conductivity c (also called permittivity), but do not have sufficiently acidic hydrogen atoms that can be detached as protons. Therefore, anions cannot be solvated by hydrogen bonds, and can only be solvated by the significantly weaker dispersion forces. This group of nucleophilic solvents includes, for example: ketones such as acetone ($\varepsilon=20$), nitriles such as acetonitrile (ACN, $\varepsilon=37$), nitro compounds such as nitromethane ($\varepsilon=37$), tertiary carboxamides such as dimethylformamide (DMF, $\varepsilon=37$), hexamethylphosphoramide ($\varepsilon=30$), sulfoxides such as dimethyl sulfoxide (DMSO, $\varepsilon=47$), sulfones such as tetrahydrothiophene 1,1-dioxide (sulfolane, $\varepsilon=44$), diethers of ethylene glycol, carbonic esters such as dimethyl carbonate, ethylene carbonate, and propylene carbonate ($\varepsilon=65$), urea derivatives such as tetramethylurea or dimethylpropyleneurea (DMPU), lactams such as N-methyl-2-pyrrolidone, and lactones such as T-butyrolactone inter alia.

Other examples of nucleophilic solvents include dimethoxyethane (DME), tetrahydrofuran (THF), diethyl ether (DEE), acetone, dioxane, dimethyl sulfoxide (DMSO), dimethylformamide (DMF), and acetonitrile (ACN).

In one embodiment, the nucleophilic solvent is acetone, tetrahydrofuran (THF), dioxane, diethyl ether (DEE), or 1,2-dimethoxyethane (DME), or THF and/or acetone.

Example 1 of the Synthesis of ViBET

4-Vinylbenzyl chloride (6.63 g, 43.5 mmol, 1.0 eq.), thioacetic acid (3.97 g, 3.75 ml, 52.2 mmol, 1.2 eq.), and potassium carbonate (6.01 g, 52.2 mmol, 1.2 eq.) were stirred in THF (80 mL) at room temperature for 19 h. Subsequently, the reaction mixture was concentrated under reduced pressure, and the residue was dissolved in demineralized water (100 mL) and extracted with EtOAc (3×70 mL). The combined organic phases were washed with saturated NaCl solution and dried over MgSO$_4$, and the solvent was removed under reduced pressure. The product was obtained in the form of an orange liquid (8.20 g, 42.6 mmol, 98%).

Example 2 of the Synthesis of ViBET

Thioacetic acid (1.71 g, 1.62 ml, 22.5 mmol, 1.5 eq.) and potassium carbonate (2.49 g, 22.5 mmol, 1.5 eq.) were initially charged in acetone (60 mL) and the mixture was stirred at room temperature for 30 min. 4-Vinylbenzyl chloride (2.83 g, 2.11 mL, 15.0 mmol, 1.0 eq.) was slowly added dropwise and the reaction mixture was stirred at 40° C. for 30 min. The solvent was removed under reduced pressure, and the residue was dissolved in demineralized water (50 mL) and extracted with EtOAc (3×30 mL). The combined organic phases were washed with saturated NaCl solution and dried over MgSO$_4$, and the solvent was removed under reduced pressure. The product was obtained in the form of an orange liquid (2.88 g, 15.0 mmol, quantitative).

The term "dienes" as used herein, in accordance with Römpp Online, are understood to mean unsaturated aliphatic and cycloaliphatic hydrocarbons containing two double bonds in the molecule. The two double bonds can be conjugated. In one embodiment, the conjugated diene is selected from the group comprising: 1,3-butadiene (butadiene), 2-methylbuta-1,3-diene (isoprene=2-($C_1$-$C_5$-alkyl)-1,3-butadiene, 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, 1,3-cyclooctadiene, and/or 2-chloro-1,3-butadiene (chloroprene).

In one embodiment, the dienes are selected from isoprene, butadiene, and chloroprene.

In another embodiment, the conjugated diene is selected from the group consisting of: 1,3-butadiene (butadiene), 2-methylbuta-1,3-diene (isoprene=2-($C_1$-$C_5$-alkyl)-1,3-butadiene, 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, 1,3-cyclooctadiene, and/or 2-chloro-1,3-butadiene (chloroprene).

In one embodiment, the dienes are selected from isoprene, butadiene, and chloroprene.

In addition, monomers such as, more particularly, alkenes, vinyl compounds, and/or vinylidene compounds can be involved in the disclosed processes, which means that the resultant copolymers are terpolymers or polymers having more than three different monomers.

Alkenes that can be involved in the polymerization as monomers are aliphatic compounds having a double bond, such as, for example, ethene, propene, butene, pentene, and/or hexene.

The term "vinyl compound" as used herein encompasses all chemical compounds having at least one vinyl group, such as acrylates, methacrylates, acrylic acid, methacrylic acid, acrylonitrile, and vinylaromatic compounds.

In one embodiment, the vinyl compound comprises at least one vinyl compound that, apart from the vinyl group, has at least one further unsaturated group carbon group, such as a double bond or an aromatic radical.

In another embodiment, the vinyl compound comprises at least one vinylaromatic compound.

In the context of the present disclosure, the term "vinylaromatic compound" encompasses monovinylaromatic compounds, that is, compounds in which only one vinyl group is bound to an aromatic group, and vinylaromatic compounds in which two or more vinyl groups are bound to an aromatic group.

Any vinylaromatic compound known to those skilled in the art can be employed as the vinylaromatic compound. For example, the vinylaromatic compound can be selected from the group consisting of: styrene, $C_{1-4}$-alkyl-substituted styrenes, stilbene, vinylbenzyldimethylamine, 4-vinylbenzyl dimethylaminoethyl ether, N,N-dimethylaminoethylstyrene, tert-butoxystyrene, vinylpyridine, and/or divinylaromatic compounds.

The $C_{1-4}$-alkyl-substituted styrenes can be, for example, 2-methylstyrene, 3-methylstyrene, 4-methylstyrene, 2,4-dimethylstyrene, 2,4,6-trimethylstyrene, alpha-methylstyrene, 2,4-diisopropylstyrene, and/or 4-tert-butylstyrene.

The term "$C_{1-4}$-alkyl-substituted" means here that an alkyl radical having 1 to 4 carbon atoms is present as a substituent for a hydrogen atom.

The divinylaromatic compounds can be, for example, 1,2-divinylbenzene, 1,3-divinylbenzene, and/or 1,4-divinylbenzene.

Vinylidene compounds, in accordance with Römpp Online, are understood as used herein to mean chemical compounds having the atomic moiety $R_1R_2=C=CH_2$ bonded via a double bond, for example $Cl_2C=CH_2$ or $F_2C=CH_2$.

The process for preparing a copolymer by free-radical copolymerization of the monomer with a diene is described hereinafter with reference to the example of the copolymerization of compound II), that is, 4-vinylbenzyl thioacetate (ViBET), with butadiene.

The disclosed methods are not limited to the illustrative monomers mentioned below but can be used for preparation of all copolymers from the above-described monomers, including for preparation of copolymers from three or more different monomers.

The polymerization was effected at 60° C. in toluene, with the following mol % of the substances used:

Example 3

36.792 mol % of butadiene, 0.639 mol % of ViBET, 0.01 mol % of AIBN, and 62.559 mol % of toluene.

Example 4

29.137 mol % of butadiene, 0.318 mol % of ViBET, 0.003 mol % of AIBN, and 62.559 mol % of toluene.

In this context, AIBN is the abbreviation for the chemical compound azobis(isobutyronitrile).

The polymerization in Example 3 proceeded for 48 hours, after which a copolymer of butadiene and ViBET having a number-average molar mass (or molar mass distribution) Mn by GPC 5052 g/mol was obtained.

To verify the incorporation of ViBET into the copolymer, the UV absorption of the sample was determined at a wavelength of 295 nm by means of GPC. Pure polybutadiene does not absorb at this wavelength, but the thioester does. Since, in addition to the RI detector, the UV detector also detects polymer, the desired copolymer has been successfully synthesized.

In the polymerization in Example 4, the increase in the Mn of the copolymer prepared was monitored with increasing reaction time. After 24 hours, the Mn was 5323 g/mol. After 48 hours, the Mn was 6265 g/mol.

For the determination of the molar mass or the molar mass distribution by means of GPC, the following measurement conditions were used: SEC Analysis Systems 1260 Infinity from PSS Agilent with: PSS Agilent Technologies 1260 Iso Pump G1310B (HPLC pump), an Agilent 1260 ALS G1329B autosampler, an Agilent 1260 ALS injector, a precolumn (PSS SDV, 8×50 mm, particle size 5 μm), three separation columns (PSS SDV, 8×300 mm, particle size: 5 μm, pore size $10^5$ (ten to the power of five) A, $10^3$ (ten to the power of three) A, and $10^2$ (ten to the power of two) A), and the detectors; PSS Agilent Technologies 1260 VWDVL UV detector at a wavelength of 310 nm and the PSS Agilent Technologies 1260 RID RI detector utilized; THF eluent (HPLC-grade) with toluene (>99.7%, dry) as internal standard (flow rate 1.0 mL/min at 35° C.). The system was calibrated with polystyrene standards having low polydispersity of PSS. For evaluation, the PSS WinGPC software was used. The detected intensities were standardized to 1 and, unless stated otherwise, were the signal from the RI detector.

Further provided are copolymers prepared by the disclosed processes. For example, a copolymer of butadiene and 4-vinylbenzyl thioacetate was prepared as described above under free-radical polymerization conditions.

Exemplary comonomers (as well as compounds I) or II)) have already been mentioned above, at least one of these being a diene.

The copolymer can also be a polymer of three or more different monomers. The copolymer can thus, for example, be a terpolymer of 4-vinylbenzyl thioacetate, styrene, and butadiene.

In addition, it is possible to use two or more different monomers of formula I) having different protecting groups P, for example.

Further provided are sulfur-crosslinkable rubber mixtures comprising at least one of the copolymers prepared by the disclosed processes.

The sulfur-crosslinkable rubber mixtures disclosed herein comprise at least one of the copolymers prepared by the disclosed processes and can also comprise at least one diene rubber known in the prior art.

Diene rubbers refer to rubbers that arise through polymerization or copolymerization of dienes and/or cycloalkenes and hence have C=C double bonds either in the main chain or in the side groups.

The diene rubber can be natural polyisoprene, synthetic polyisoprene, polybutadiene (butadiene rubber), unfunctionalized styrene-butadiene copolymer (styrene-butadiene rubber), epoxidized polyisoprene, styrene-isoprene rubber, halobutyl rubber, polynorbornene, isoprene-isobutylene copolymer, ethylene-propylene-diene rubber, nitrile rubber, chloroprene rubber, acrylate rubber, fluoro rubber, silicone rubber, polysulfide rubber, epichlorohydrin rubber, styrene-isoprene-butadiene terpolymer, hydrogenated acrylonitrile-butadiene rubber, and/or hydrogenated styrene-butadiene rubber.

For example, nitrile rubber, hydrogenated acrylonitrile-butadiene rubber, chloroprene rubber, butyl rubber, halobutyl rubber, or ethylene-propylene-diene rubber is used in the production of industrial rubber articles such as cords, belts, hoses, and/or shoe soles.

The terms "vulcanized" and "crosslinked" are used synonymously herein.

The disclosed rubber mixtures further can comprise at least one filler such as silica, carbon black, and optionally further known polar and/or nonpolar fillers, such as aluminosilicates, chalk, kaolin, starch, magnesium oxide, titanium dioxide, and/or rubber gels, and also carbon nanotubes (CNTs, including discrete CNTs, called hollow carbon fibers (HCFs) and modified CNTs containing one or more functional groups, such as hydroxyl, carboxyl, and carbonyl groups), graphite, graphenes, and/or what is called "carbon-silica dual-phase filler".

If the filler is at least one silica, the rubber mixture can contain, for example 1 to 300 phr, 1 to 200 phr, or 1 to 150 phr, of at least one silica.

If the filler is at least one carbon black, the rubber mixture can contain, 1 to 200 phr, 1 to 170 phr, or 1 to 100 phr of at least one carbon black.

The silicas can be silicas known to those skilled in the art that are suitable as filler for tire rubber mixtures. Exemplary fillers include finely divided precipitated silica having a nitrogen surface area (BET surface area) (in accordance with DIN ISO 9277 and DIN 66132) of 35 to 350 m$^2$/g, 60 to 260 m$^2$/g, or 120 to 230 m$^2$/g, and a CTAB surface area (in accordance with ASTM D 3765) of 30 to 400 m$^2$/g, 60 to 250 m$^2$/g, or 120 to 230 m$^2$/g.

If the rubber mixture comprises carbon black, all types of carbon black known to those skilled in the art are conceivable. For example, a carbon black having an iodine adsorption number to ASTM D 1510 of 30 to 180 g/kg, 30 to 130 g/kg, or DBP number to ASTM D 2414 of 80 to 200 mL/100 g, 100 to 200 mL/100 g, or 100 to 180 mL/100 g can be used.

The disclosed rubber mixtures can also comprise a mixture of two or more of the fillers mentioned.

As used herein, the term "zinc oxide" does not count as one of the fillers, but is present in the rubber mixture in combination with stearic acid.

In addition, the rubber mixture, for example, also comprises further additives. Further additives essentially include—as well as zinc oxide (ZnO) and stearic acid—optionally silane coupling agents for the binding of silica to the polymer chains of the rubbers present, plasticizers, the vulcanization system composed of sulfur and/or sulfur donors with the aid of vulcanization accelerators, antiozonants, aging stabilizers, tackifying resins, masticating aids, and further activators or processing aids, for example fatty acid salts, for example zinc soaps and fatty acid esters and derivatives thereof, for example zinc stearate, or zinc complexes, for example zinc ethylhexanoate.

Silane coupling agents can include any silane coupling agents known to those skilled in the art for use in rubber mixtures. One or more different silane coupling agents can be used in combination with one another. The rubber mixture can thus comprise a mixture of different silanes.

The silane coupling agents react with the surface silanol groups of the silica or other polar groups during the mixing of the rubber or of the rubber mixture (in situ) or in the manner of a pretreatment (premodification) even before addition of the filler to the rubber. Such coupling agents known from the prior art are bifunctional organosilanes that have at least one alkoxy, cycloalkoxy, or phenoxy group as leaving group on the silicon atom and have, as another functionality, a group that can, after dissociation if appropriate, enter into a chemical reaction with the double bonds of the polymer. The latter group can, for example, be one of the following chemical groups: —SCN, —SH, —NH$_2$ or —S$_x$— (where x=2 to 8).

For instance, silane coupling agents used can be 3-mercaptopropyltriethoxysilane, 3-thiocyanatopropyltrimethoxysilane, or 3,3'-bis(triethoxysilylpropyl) polysulfides having 2 to 8 sulfur atoms, for example, 3,3'-bis(triethoxysilylpropyl) tetrasulfide (TESPT), the corresponding disulfide (TESPD), or else mixtures of the sulfides having 1 to 8 sulfur atoms with different contents of the various sulfides. TESPT can, for example, also be added as a mixture with industrial carbon black (trade name: X50S® from Evonik). In one embodiment, a silane mixture is used comprising disulfides to an extent of 40% to 100% by weight, 55% to 85% by weight of disulfides, or 60% to 80% by weight of disulfides. A mixture of this kind is available, for example, under the Si 261® trade name from Evonik, which is described, for example, in DE 102006004062 A1.

Blocked mercaptosilanes, as known, for example, from WO 99/09036, can also be used as silane coupling agent. It is also possible to use silanes as described in WO 2008/083241 A1, WO 2008/083242 A1, WO 2008/083243 A1 and WO 2008/083244 A1. It is possible to use, for example, silanes that are marketed under the NXT name (for example, 3-(octanoylthio)-1-propyltriethoxysilane) in a number of variants from Momentive, USA, or those that are marketed under the name VP Si 363® by Evonik Industries.

It is also conceivable that one of the abovementioned mercaptosilanes, especially 3-mercaptopropyltriethoxysilane, is used in combination with processing aids (that are listed below), especially PEG carboxylates.

In addition, the rubber mixture can comprise further activators and/or agents for the incorporation of fillers, such as carbon black. The latter may, for example, be the compound S-(3-aminopropyl)thiosulfuric acid as disclosed, for example, in EP 2589619 A1, and/or metal salts thereof, that give rise to very good physical properties of the rubber mixture especially in combination with at least one carbon black as filler.

The proportion by weight of the total amount of further additives is 3 to 150 phr, 3 to 100 phr, or 5 to 80 phr.

The plasticizers used in the context of the present disclosure include all the plasticizers that are known to those skilled in the art, such as aromatic, naphthenic, or paraffinic mineral oil plasticizers, for example MES (mild extraction solvate), RAE (residual aromatic extract), TDAE (treated distillate aromatic extract), rubber-to-liquid oils (RTL), or biomass-to-liquid oils (BTL), such as those having a content of polycyclic aromatics of less than 3% by weight according to method IP 346, or rapeseed oil, factices, plasticizer resins that are not among the tackifying resins mentioned above, or liquid polymers having a mean molecular weight (determination by GPC=gel permeation chromatography, in accordance with BS ISO 11344:2004) between 500 and 20 000 g/mol. If additional liquid polymers are used as plasticizers in the disclosed rubber mixtures, these are not counted as rubber in the calculation of the composition of the polymer matrix.

The unit "phr" (parts per hundred parts of rubber by weight) used in this text is the standard unit of amount for blend recipes in the rubber industry. The dosage of the parts by weight of the individual substances is always based here on 100 parts by weight of the total mass of all rubbers present in the mixture.

The vulcanization of the disclosed sulfur-crosslinkable rubber mixtures is conducted in the presence of sulfur and/or sulfur donors with the aid of vulcanization accelerators, it being possible for some vulcanization accelerators to act simultaneously as sulfur donors. For example, the accelerator can be selected from the group consisting of: thiazole accelerators, mercapto accelerators, sulfenamide accelerators, thiocarbamate accelerators, thiuram accelerators, thiophosphate accelerators, thiourea accelerators, xanthogenate accelerators, and/or guanidine accelerators.

In one embodiment, a sulfenamide accelerator is selected from the group consisting of: N-cyclohexyl-2-benzothiazolesulfenamide (CBS), N,N-dicyclohexylbenzothiazole-2- sulfenamide (DCBS), benzothiazyl-2-sulfenomorpholide (MBS), and/or N-tert-butyl-2-benzothiazylsulfenamide (TBBS).

Sulfur-donating substances used can be any of the sulfur-donating substances known to those skilled in the art. If the rubber mixture comprises a sulfur-donating substance, it can be selected from, for example, thiuram disulfides, for example tetrabenzylthiuram disulfide (TBzTD), tetramethylthiuram disulfide (TMTD), tetraethylthiuram disulfide (TETD), and/or thiuram tetrasulfides, for example dipentamethylenethiuram tetrasulfide (DPTT) and/or dithiophosphates, for example DipDis (bis(diisopropyl)thiophosphoryl disulfide), bis(O,O-2-ethylhexylthiophosphoryl) polysulfide (for example, Rhenocure SDT 50®, Rheinchemie GmbH), zinc dichloryldithiophosphate (for example, Rhenocure ZDT/S®, Rheinchemie GmbH), zinc alkyldithiophosphate-1,6-bis(N,N-dibenzylthiocarbamoyldithio)hexane, diaryl polysulfides, and/or dialkyl polysulfides.

Further network-forming systems as obtainable, for example, under the Vulkuren®, Duralink® or Perkalink® trade names or network-forming systems as described in WO 2010/049216 A2 can also be used in the rubber mixture.

Also disclosed is the use of the disclosed sulfur-crosslinkable rubber mixtures for production of a motor vehicle tire. Thus, a motor vehicle tire is disclosed, the production of which involves using at least one inventive sulfur-crosslinkable rubber mixture—comprising at least one copolymer disclosed herein and prepared by at least one process as described above.

Motor vehicle tires, as referred to herein, are understood to mean pneumatic motor vehicle tires and solid rubber tires, including tires for industrial and construction site vehicles, cars, trucks and bicycle tires.

In one embodiment, the tire is a pneumatic motor vehicle tire.

In this context, use in all tire components is conceivable in principle, such as, more particularly, the tread, the sidewall, and/or in at least one inner component.

Internal tire components refer essentially to the squeegee, inner liner, core profile, breaker belt, shoulder, breaker belt profile, carcass, bead reinforcement, bead profile, flange profile, and bandage.

Rubber mixtures for the inner tire components and the sidewall are also referred to as body mixture.

In one embodiment, the rubber mixtures disclosed herein are used in treads of motor vehicle tires, and for instance, at least in the cap of treads having cap/base construction.

Treads make a considerable contribution to the abrasion characteristics and rolling resistance of the motor vehicle tire. In addition, treads in particular have to be crack-resistant.

For use in motor vehicle tires, the disclosed mixtures are brought into the shape of a tread, for instance at least into the shape of a tread cap, as a finished mixture prior to vulcanization, and applied in the known manner in the production of the motor vehicle tire blank. However, the tread, for instance at least the tread cap, can also be rolled up in the form of a narrow strip of rubber mixture on to a tire blank. In the case of two-part treads (upper part: cap and lower part: base), the rubber mixtures disclosed herein can be used both for the cap and for the base.

The production of the rubber mixtures disclosed herein for use as body mixture in motor vehicle tires is effected as described above for the tread. The difference lies in the shaping after the extrusion operation or the calendering of the mixture. The shapes of the as yet unvulcanized rubber mixture for one or more different body mixtures that are obtained in this way then serve for the construction of a tire blank.

The tire blank is then vulcanized under conditions known in the prior art.

Also disclosed is the use of the sulfur-crosslinkable rubber mixture described for production of a cord, belt, or hose.

For use of the disclosed rubber mixtures in belts, cords, and hoses, especially, for example, in conveyor belts, the extruded, as yet unvulcanized mixture is converted to the appropriate shape and, if appropriate, frequently provided at the same time or subsequently with strengthening members, for example synthetic fibers or steel cords. This usually gives rise to a multilayer construction consisting of one or more plies of rubber mixture, one or more plies of identical or different strengthening members and one or more further plies of the same or different rubber mixture.

It is understood that the foregoing description is that of various embodiments and that various changes and modifications can be made thereto without departing from the spirit and scope of the disclosure as defined in the appended claims.

What is claimed is:

1. A process comprising:
preparing a copolymer which comprises:
free-radical copolymerization of a monomer of the following formula I) with at least one diene:

$$A\text{-}S\text{-}P \qquad \qquad I)$$

wherein
A is a chemical group containing at least one aliphatic double bond,
S is a sulfur atom,
P is a protecting group selected from the group consisting of:
$S(=O)_2-R^1$, $S-C(=S)-N-R^2R^3$, $C(=O)-R^4$, and $N-R^5R^6$,
$R^1$=alkyl, or benzyl,
$R^2$ and $R^3$=alkyl, benzyl, or phenyl,
$R^4$=alkyl,
$R^5$=hydrogen atom (H), alkyl, benzyl, or phenyl,
$R^6$=alkyl, benzyl, or phenyl, and
the at least one diene is selected from the group consisting of: 1,3-butadiene, 2-methylbuta-1,3-diene, 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene, 1,3-cyclooctadiene, and 2-chloro-1,3-butadiene; and,
wherein the monomer has a protected mercapto group;
preparing a sulfur-crosslinkable rubber mixture comprising the copolymer;
vulcanizing the sulfur-crosslinkable rubber mixture, wherein the protected mercapto group becomes deprotected during the vulcanizing and wherein the sulfur atom takes part in the vulcanizing:
provided the A-S-P is not 4-vinylbenzyl thioacetate.

2. The process of claim 1, wherein A is a 4-vinylbenzyl group.

* * * * *